United States Patent [19]

Marui

[11] Patent Number: 5,687,616
[45] Date of Patent: Nov. 18, 1997

[54] HANDLE STEM FIXING DEVICE IN A BICYCLE

[75] Inventor: Kohei Marui, Kobe, Japan

[73] Assignee: Marui Co, Ltd., Kobe, Japan

[21] Appl. No.: 624,333

[22] Filed: Mar. 29, 1996

Related U.S. Application Data

[62] Division of Ser. No. 311,123, Sep. 23, 1994, Pat. No. 5,553,511.

[30] Foreign Application Priority Data

Oct. 5, 1993 [JP] Japan .................. 5-249533

[51] Int. Cl.⁶ .................................................. B62K 21/12
[52] U.S. Cl. .................................... 74/551.1; 280/279
[58] Field of Search ..................... 74/551.1, 551.3, 74/551.8; 280/279, 280, 281.1; 403/368–370

[56] References Cited

U.S. PATENT DOCUMENTS

| | | | |
|---|---|---|---|
| 2,280,662 | 4/1942 | Pawsat | 74/551.1 |
| 3,722,930 | 3/1973 | Humlong | 74/551.1 X |
| 4,068,858 | 1/1978 | Harrison et al. | 280/279 X |
| 4,167,352 | 9/1979 | Pletscher | 403/369 X |
| 5,095,770 | 3/1992 | Rader, III | 074/551.1 |
| 5,197,349 | 3/1993 | Herman | 74/551.1 |
| 5,209,138 | 5/1993 | Shu | 74/551.2 |
| 5,269,550 | 12/1993 | Hon et al. | 280/278 |
| 5,273,181 | 12/1993 | Boudreau | 74/551.1 |
| 5,319,993 | 6/1994 | Chiang | 74/551.1 |
| 5,330,302 | 7/1994 | Chen | 074/551.1 X |
| 5,387,255 | 2/1995 | Chiang | 280/279 X |
| 5,437,208 | 8/1995 | Cheng | 74/551.1 |
| 5,442,973 | 8/1995 | Liao | 403/370 X |
| 5,454,281 | 10/1995 | Chi | 74/551.1 |
| 5,536,104 | 7/1996 | Chen | 403/370 |
| 5,544,905 | 8/1996 | Chen | 280/279 |

FOREIGN PATENT DOCUMENTS

| | | | |
|---|---|---|---|
| 426224 | 7/1911 | France | 74/551.1 |
| 572258 | 6/1924 | France | 74/551.1 |

Primary Examiner—Vinh T. Luong
Attorney, Agent, or Firm—Rabin, Champagne & Lynt, P.C.

[57] ABSTRACT

In a handle stem fixing device in a bicycle wherein a fork stem 10 is rotatably inserted into a head pipe 20 of a frame 2, the upper portion of the fork stem 10 projects out from the upper end of the head pipe 20 and, a stem-binding cylinder 30 is fixed on the upper portion of the fork stem 10 so as not to rotate. Many small protrusions are formed on the outer surface of the fork stem 10 where is pressed by the stem-binding cylinder 30. The coefficient of friction between contact surfaces of the fork stem 10 and the stem-binding cylinder 30 increases because of the protrusions. The coupling power acting between the fork stem 10 and the stem-binding cylinder 30 can thus be improved.

17 Claims, 9 Drawing Sheets

HANDLE STEM FIXING DEVICE IN A BICYCLE

This is a Division of application Ser. No. 08/311,123, filed Sep. 23, 1994 now U.S. Pat. No. 5,553,511.

FIELD OF THE INVENTION

This invention relates to a handle stem fixing device in a bicycle, and more particularly to a fixing device for fixing the handle stem to a fork stem of a bicycle.

BACKGROUND OF THE INVENTION

Figure 13:
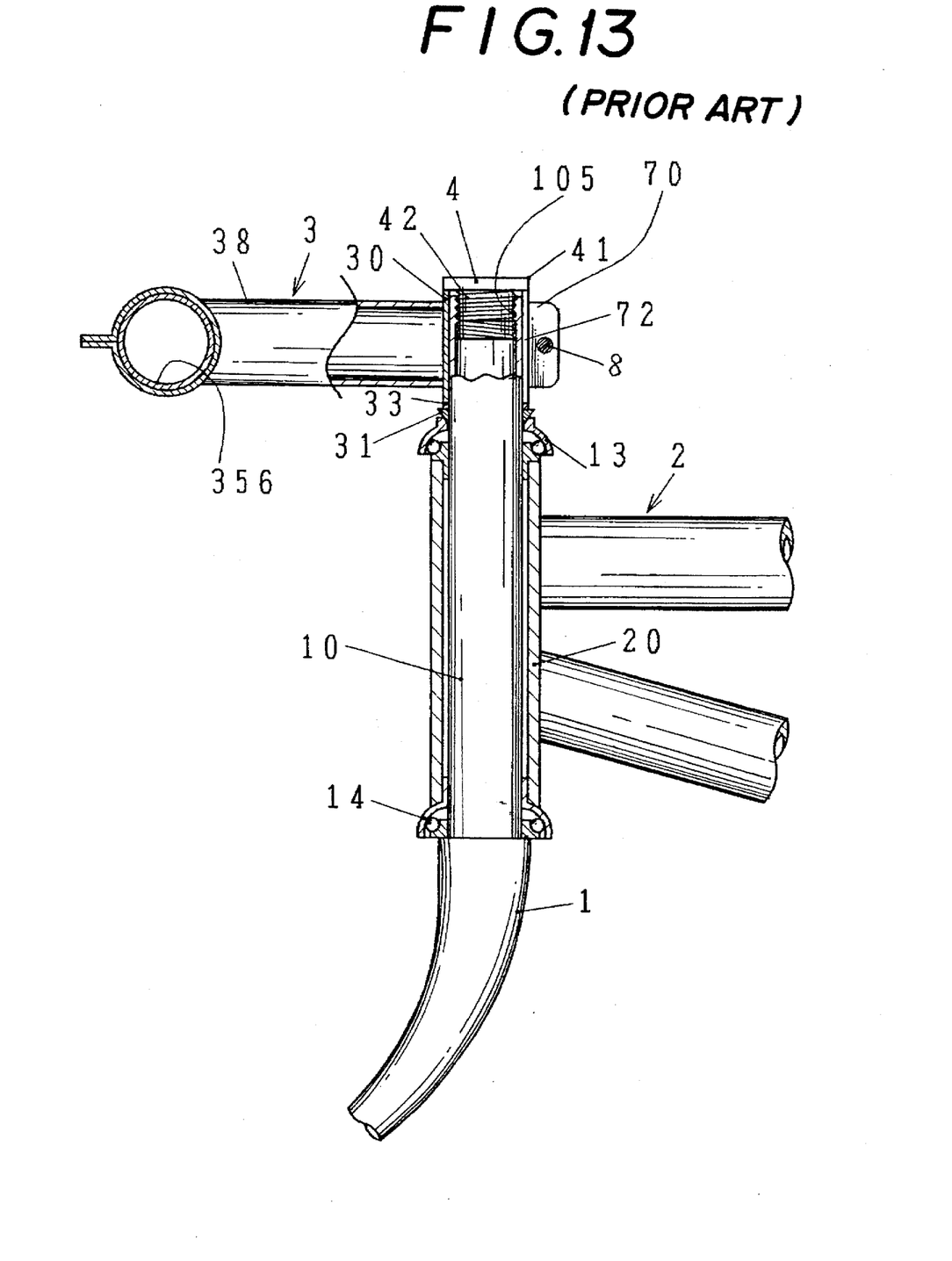
FIG. 13 is a longitudinal sectional view of a stem-binding cylinder fixed on a fork stem in accordance with the prior art.

FIG. 13 exhibits a prior device for fixing a handle stem.

A fork stem 10 provided on a front fork 1 is inserted into a head pipe 20 of a skeleton frame 2. The fork stem 10 is rotatably mounted in the head pipe 20 by an upper bearing 13 and a lower bearing 14. There is a space between an inner surface of the upper bearing 13 and an outer surface of the fork stem 10. A tapered ring 31 is inserted into the space as if it were a wedge. Thus, the head pipe 20 is kept concentric to the fork stem 10. On the other hand, a handle stem 3 consists of a stem-binding cylinder 30 coupling on the fork stem 10 and an arm 38 projecting approximately horizontally toward a handle bar 356. The binding cylinder 30 has a pair of tightening ears which face each other with a small clearance 72 between them. The tightening ear 70 is perforated by a through hole and the other tightening ear (not illustrated in FIG. 13) is perforated by a threaded hole. The through hole and the threaded hole are arranged coaxially. A bolt 8 penetrates the through hole and the threaded hole in the tightening ears.

The conventional coupling of the handle stem to the frame 2 will be explained now. The upper bearing 13 and the lower bearing 14 are mounted at both ends of the head pipe 20. And then the fork stem 10 is inserted into the head pipe 20. The top of the fork stem 10 projects out from the upper end of the head pipe 20.

Next, the tapered ring 31 is put on the fork stem and a lower part of the tapered ring 31 is pushed into the space between the outer surface of the fork stem 10 and the inner surface of the upper bearing 13 as if it were a wedge. A ring 33 and the binding cylinder 30 of the handle stem 3 are put on the fork stem 10. A screw cap 4 is engaged with a threaded inner surface 105 formed at the upper end portion of the fork stem 10. The cap has a flange 41 at an outer periphery thereof. When the screw cap 4 is screwed into the fork stem 10, the flange 41 presses the top end of the stem-binding cylinder 30. Thus, the stem-binding cylinder 30 is fixed on the fork stem 10 in the axial direction thereof. At the same time, the ring 33 and the tapered ring 31 are forced down by the binding cylinder 30, and the tapered ring 31 is pushed into the space between the outer surface of the fork stem 10 and the inner surface of the upper bearing 13. Thereby, the upper bearing 13 is kept concentric to the fork stem 10. Moreover, the upper and lower bearings 13, 14 are not shaky because they are pushed down by the tapered ring 31 and the head pipe 20.

Finally, the bolt 8 is inserted through the holes in the tightening ears that face each other with the small clearance 72. The threaded hole in one of the tightening ears is engaged with the bolt 8. Then, when the bolt 8 is tightened, the clearance 72 decreases. As a result, the diameter of the stem-binding cylinder 30 becomes smaller. Therefore, the outer surface of the fork stem 10 is pressed by the inner surface of the stem-binding cylinder 30. In other words, the stem-binding cylinder 30 is fixed on the fork stem 10 so that the binding cylinder 30 may not rotate on the fork stem 10.

According to the aforementioned prior device, however, there is a problem in that the stem-binding cylinder 30 cannot be bound and fixed to the fork stem 10 rapidly and certainly.

The reason for this is that, in the conventional coupling, both the inner surface of the binding cylinder 30 and the outer surface of the fork stem 10 are smooth surfaces and the coefficient of friction between the above mentioned two surfaces is left out of consideration.

Accordingly, it is necessary to enlarge the binding force of the stem-binding cylinder against the outer surface of the fork stem 10 in order to join two members together in a stable state.

A purpose of this invention is to provide a handle stem fixing device which improves the fixing power of the stem-binding cylinder to the fork stem.

SUMMARY OF THE INVENTION

The handle stem fixing device for a bicycle of this invention comprises a fork stem which is rotatably inserted into a head pipe of a bicycle frame and which has an upper portion that projects out from the upper end of the head pipe, a stem-binding cylinder having an inner surface which presses the outer surface of the upper portion of the fork stem, and a large number of small protrusions formed on the outer surface of the upper end of the fork stem.

The functions of this invention will be explained now.

When the handle stem is attached to the frame, in the same way as the conventional coupling, the stem-binding cylinder is fitted on the upper part of the fork stem. In this state, when a pressing force of the inner surface of the binding cylinder acts on the outer surface of the fork stem, the binding cylinder can be coupled on the upper part of the fork stem without revolution. Since many small protrusions are formed on the outer surface of the upper portion of the fork stem, the coefficient of friction between contact surfaces of the fork stem and the stem-binding cylinder increases relative to that present in the prior coupling.

Accordingly, the friction coupling force of the inner surface of the stem-binding cylinder to the outer surface of the fork stem also increases.

The advantage of this invention is as follows: When the stem-binding cylinder is attached to the fork stem, the friction coupling force between the inner surface of the binding cylinder and the outer surface of the fork stem increases, so the binding cylinder can be bound and fixed on the fork stem by a small force. Namely, the a binding cylinder can be fixed on the upper portion of the fork stem with a high degree of efficiency.

DETAILED DESCRIPTION OF PREFERRED EMBODIMENTS

Embodiments of this invention are explained in accordance with the figures.

In this embodiment, the outer surface of the upper part of a fork stem 10 has a threaded surface 100 and a screw cap 4 is a nut with internal threads. The fork stem 10 is inserted into a stem-binding cylinder 30 of a handle stem 3 and the screw cap 4 is engaged with the threads 100 of the fork stem 10 projected out from the upper end of the binding cylinder. Thus, the stem-binding cylinder 30 is fixed on the fork stem 10 in an axial direction thereof.

Figure 1:
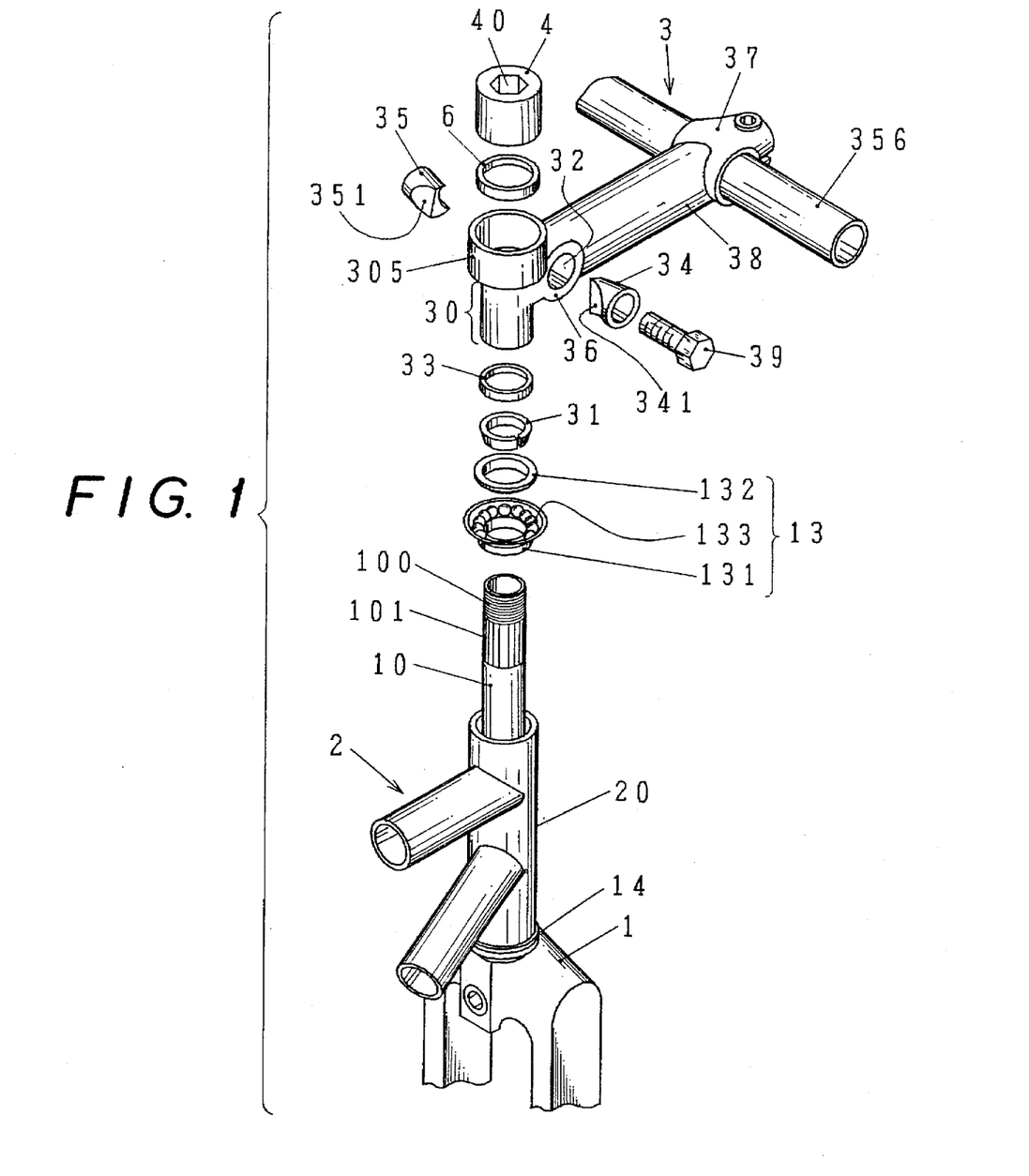
FIG. 1 is a exploded perspective view of a fork stem, stem-binding cylinder and other parts for coupling according to an embodiment of this invention.
Figure 10:
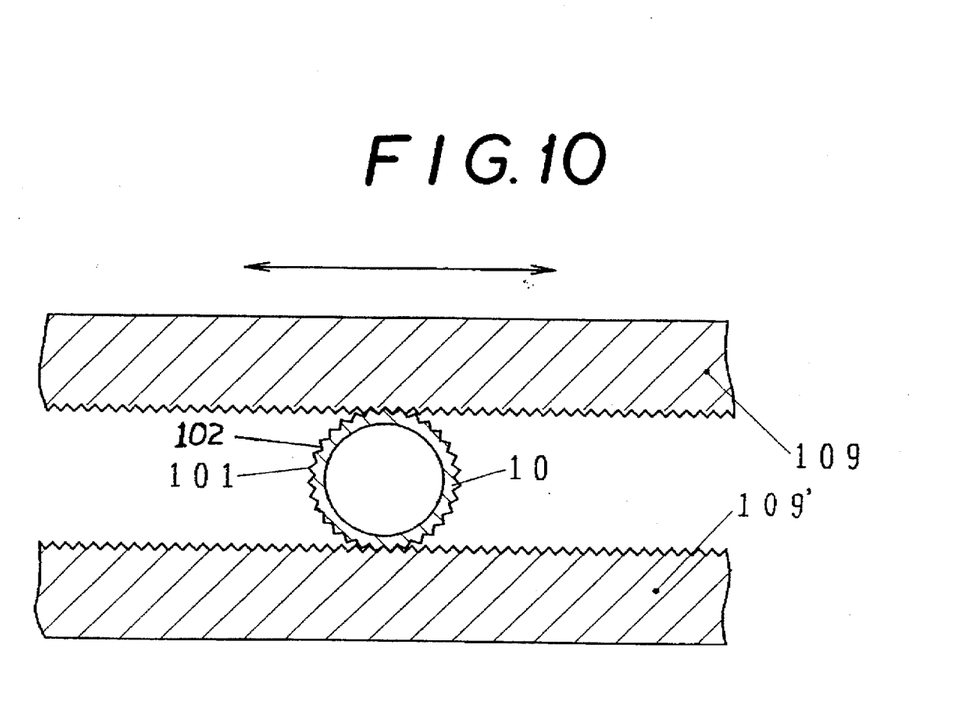
FIG. 10 is a sectional view of a knurling tool.

The fork stem 10 is provided on a front fork 1 and inserted into a head pipe 20, as shown in FIG. 1. A part of the outer surface of the fork stem 10, below the thread 100, has a knurled surface 101 which provides many small protrusions in the form of ribs 102 that are parallel to the axis of the fork stem and the distance between adjacent ribs, from peak to peak, is 1 mm to 4 mm. The knurled surface 101 can be formed by knurling tools having notched surfaces. As shown in FIG. 10, the knurling tools 109, 109' face each other and the facing surfaces thereof are the notched surfaces. The upper portion of the fork stem, where the knurled surface 101 will be formed, is laid between the knurling tools 109, 109'. The notched surfaces press the outer surface of the fork stem and the upper knurling tool 109 is reciprocated with respect to the fixed lower knurling tool 109'. Therefore, the knurled surface 101 can be made on the outer surface of the fork stem 10, according to the notched surfaces of the knurling tools.

An upper bearing 13 is mounted at the upper end of the head pipe 20 and a lower bearing 14 is mounted at the lower end of the head pipe 20 for supporting the fork stem 10 rotatably. The upper bearing 13 consists of a top ball head cup 131, balls 133 and a screwed ball race 132 for preventing escape of the balls. The lower bearing 14 consists of a bottom ball head cup 141, balls 143 and a crown ball race 142 (see FIG. 2). A tapered ring 31 is put on the screwed ball race 132. The tapered ring 31 has a tapered side surface and a C-shaped horizontal section.

On the other hand, the handle stem 3 consists of a bar-binding cylinder 37 and an arm 38 which is connected to the stem-binding cylinder 30 and which holds a handle bar 356 as shown in FIG. 1.

The inner diameter of the stem-binding cylinder 30 almost corresponds to the outer diameter of the fork stem 10. A cylindrical head 305 is provided on the top of the stem-binding cylinder 30 for receiving the screw cap 4. The outer diameter of the cylindrical head 305 is larger than that of the stem-binding cylinder 30. The cylindrical head 305 is concentric with the stem-binding cylinder 30.

Figure 3:
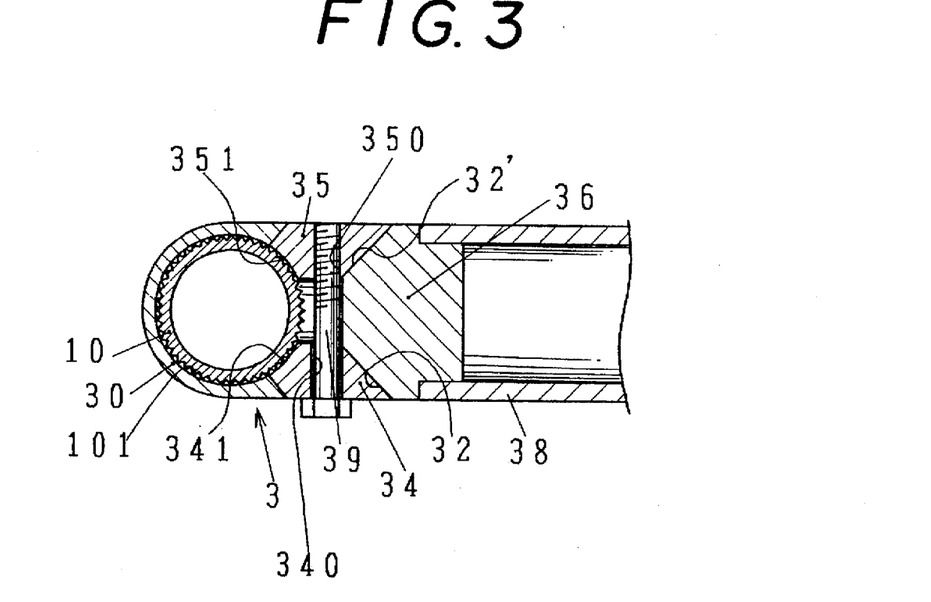
FIG. 3 is a transverse sectional view taken along the line III—III of FIG. 2, and shows the stem-binding cylinder, the fork stem and skew blocks.

The arm 38 has an end portion which is connected to the stem-binding cylinder 30 as one body, as shown in FIG. 1 and FIG. 3. The arm 38 includes a member 36 at its end portion. The end portion of arm 38 has two slanting holes 32, 32' whose central axes run toward the center of the stem-binding cylinder 30.

Skew blocks 34, 35 are put into the slanting holes 32, 32'. A through hole 340 perforates the block 34 and a threaded hole 350 perforates the block 35. A tightening bolt 39 passes through the through hole 340 and then is screwed into the threaded hole 350.

The screw cap 4 is a nut having a hexagonal socket head 40.

Figure 2:
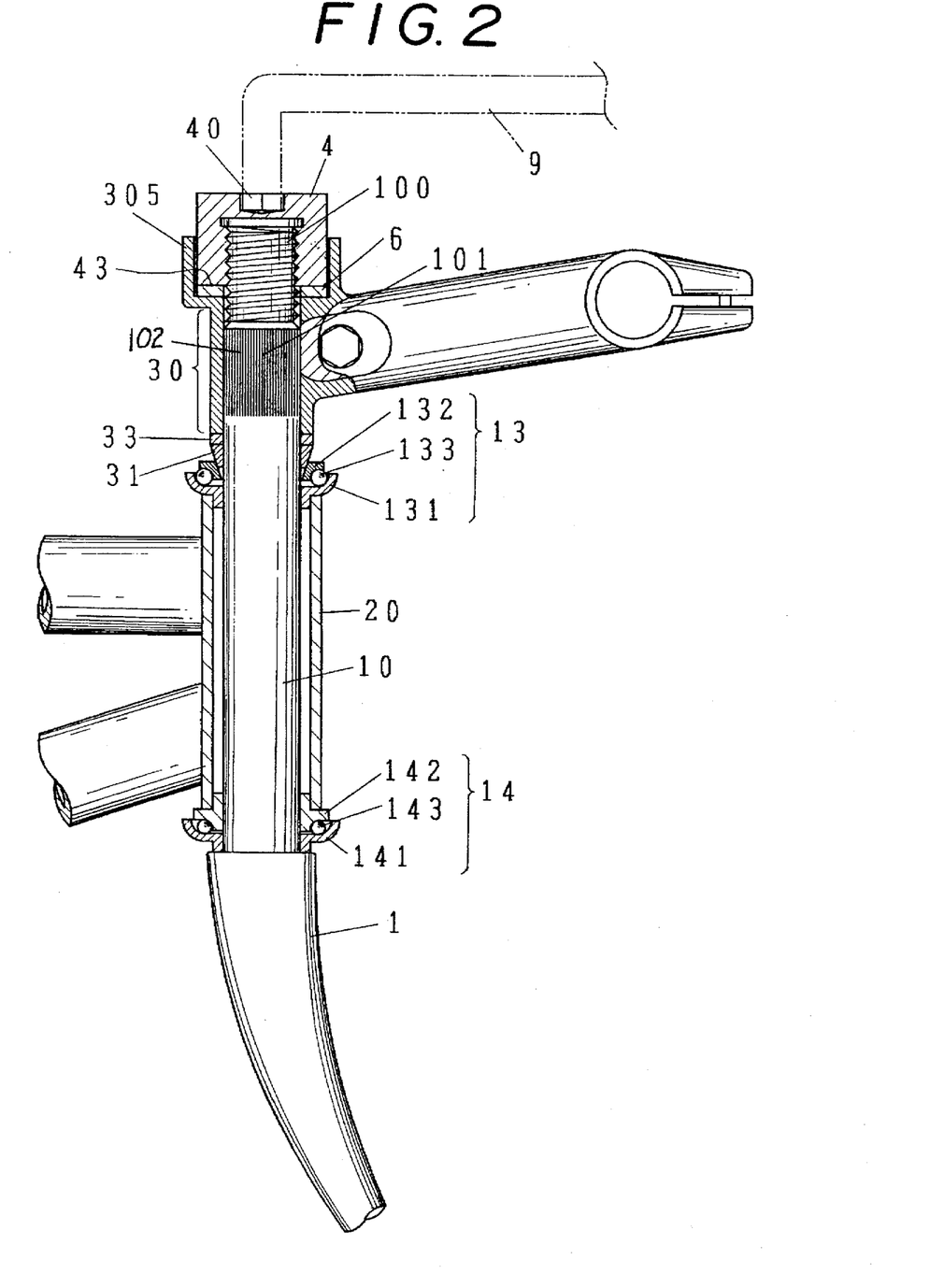
FIG. 2 is a longitudinal sectional view of the stem-binding cylinder fixed on the fork stem.

Next, the operation for fitting the handle stem 3 to the bicycle frame 2 will be explained. First, the lower bearing 14 is put on the lower end of the fork stem 10 and then the fork stem 10 is inserted into the head pipe 20 in the frame 2. The upper portion of the fork stem 10 is projected out from the upper end of the head pipe 20. The upper bearing 13, tapered ring 31 and the ring 33 are put on the upper portion of the handle stem 10 in this mentioned order. Furthermore, the stem-binding cylinder 30 of the handle stem 3 is fitted on the fork stem 10. Then, as shown in FIG. 2, the fork stem 10 penetrates the stem-binding cylinder 30 and the thread 100 formed at the upper portion of the fork stem 10 stands out into the cylindrical head 305 formed on a top of the binding cylinder 30. The screw cap 4 is fitted on the thread 100 and tightened via a washer 6 by a hexagon wrench key 9. Therefore, the bottom surface 43 of the cap 4 pushes the top of the stem-binding cylinder 30 and, as explained with respect to the prior art device, the bottom surface of the binding cylinder 30 pushes the tapered ring 31 so that the tapered ring 31 is pushed into a space between the outer surface of the fork stem and the inner surface of the screwed ball race 132 as if it were a wedge. Thereby, the upper bearing 13, the lower bearing 14 and the head pipe 20 are kept concentric to the fork stem 10. Moreover, the upper and lower bearings 13, 14 do not shake because these bearings are pushed down by the stem-binding cylinder 30.

Thus, the stem-binding cylinder 30 of the handle stem 3 is fixed to the fork stem 10 so that the fork stem 10 cannot move in the axial direction. Next, how the handle stem 3 is fixed to the fork stem 10, so that the stem-binding cylinder 30 cannot rotate on the fork stem 10, will be explained.

The skew blocks 34, 35 are inserted into the respective slanting holes 32, 32'. In this state, the through hole 340 and the threaded hole 350 lie straight along a line. The bolt 39 penetrates the through hole 340 and screws into the threaded hole 350. The skew blocks 34, 35 approach each other, while sliding into the slanting holes 32, 32' toward an opening in the stem-binding cylinder 30. Thus, partial cylindrical curved surfaces 341,351 of the skew blocks 34, 35 press against the knurled surface 101 formed on the outer surface of the fork stem 10. In other words, the knurled surface 101 of the fork stem 10 is pressed by the stem-binding cylinder 30 and the partial cylindrical curved surfaces 341, 351. The coefficient of friction of the contact surfaces between the fork stem and the stem-binding cylinder and between the fork stem and the partial cylindrical curved surfaces 341,351 of the skew blocks 34, 35 is relatively large, and therefore the frictional binding force acting between the contact surfaces is also relatively large. Accordingly, the fork stem 10 and the skew blocks 34, 35 are firmly fixed so that the stem-binding cylinder 30 cannot rotate on the fork stem 10.

Figure 4:
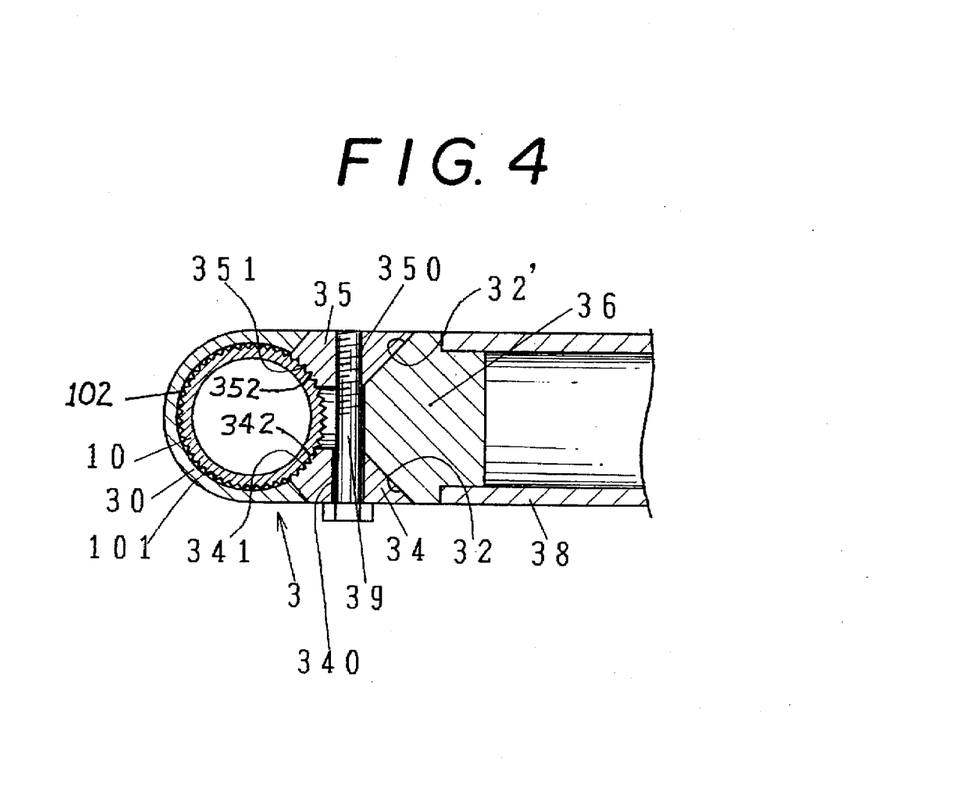
FIG. 4 is a transverse sectional view of the stem-binding cylinder, the fork stem and skew blocks of a second embodiment.
Figure 9:
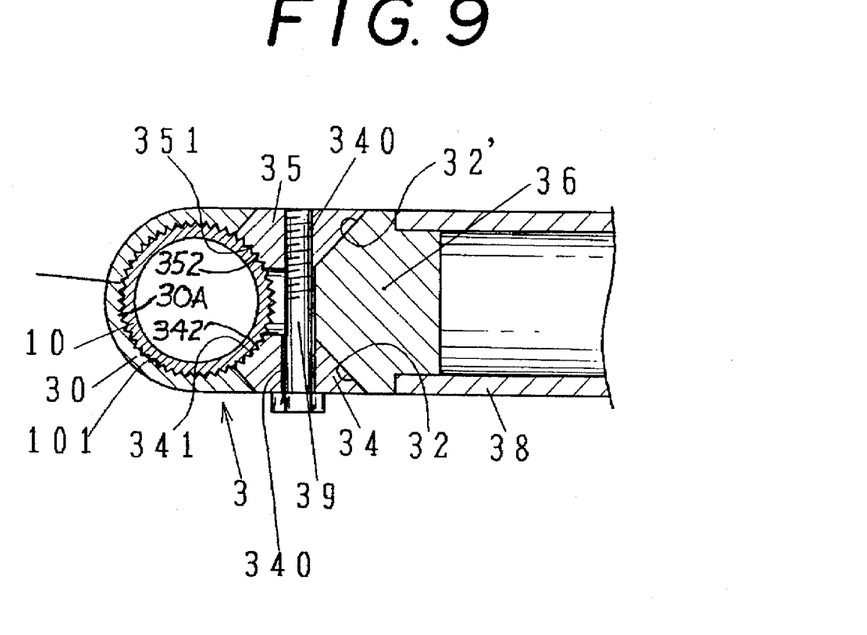
FIG. 9 is a transverse sectional view of the stem-binding cylinder, the fork stem and skew blocks of a sixth embodiment.

Several parts in the above mentioned embodiment can be changed as follows:

1. As illustrated in FIG. 4, small protrusions such as ribs 342,352 formed by knurling may also be provided, respectively, on the partial cylindrical curved surfaces 341, 351 of the skew blocks 34, 35 so as to engage with the outer surface of the fork stem 10. In this state, the ribs 342,352 of the skew blocks 34, 35 fit into spaces between the adjacent ribs 102 formed on the fork stem 10. Accordingly, the binding force between the fork stem 10 and the stem-binding cylinder 30 increases even more. Therefore, the stem-binding cylinder 30 is fixed on the fork stem 10 firmly. Moreover, as shown in FIG. 9, the stem-binding cylinder 30 may have small protrusions such as ribs 30A formed by knurling at the inner surface thereof to coincide with the knurled surface of the fork stem 10. The many ribs can be formed at the inner surface of the stem-binding cylinder 30 by inserting a columnar knurling tool having a notched outer surface into the stem-binding cylinder 30 by force. In this embodiment, the ribs 102 of the fork stem 10 can be fitted into the spaces between the adjacent ribs 342,352, and 30A of the skew blocks 34, 35 and the stem-binding cylinder 30. The stem-binding cylinder 30 is fixed on the fork stem 10 more firmly.

Figure 5:
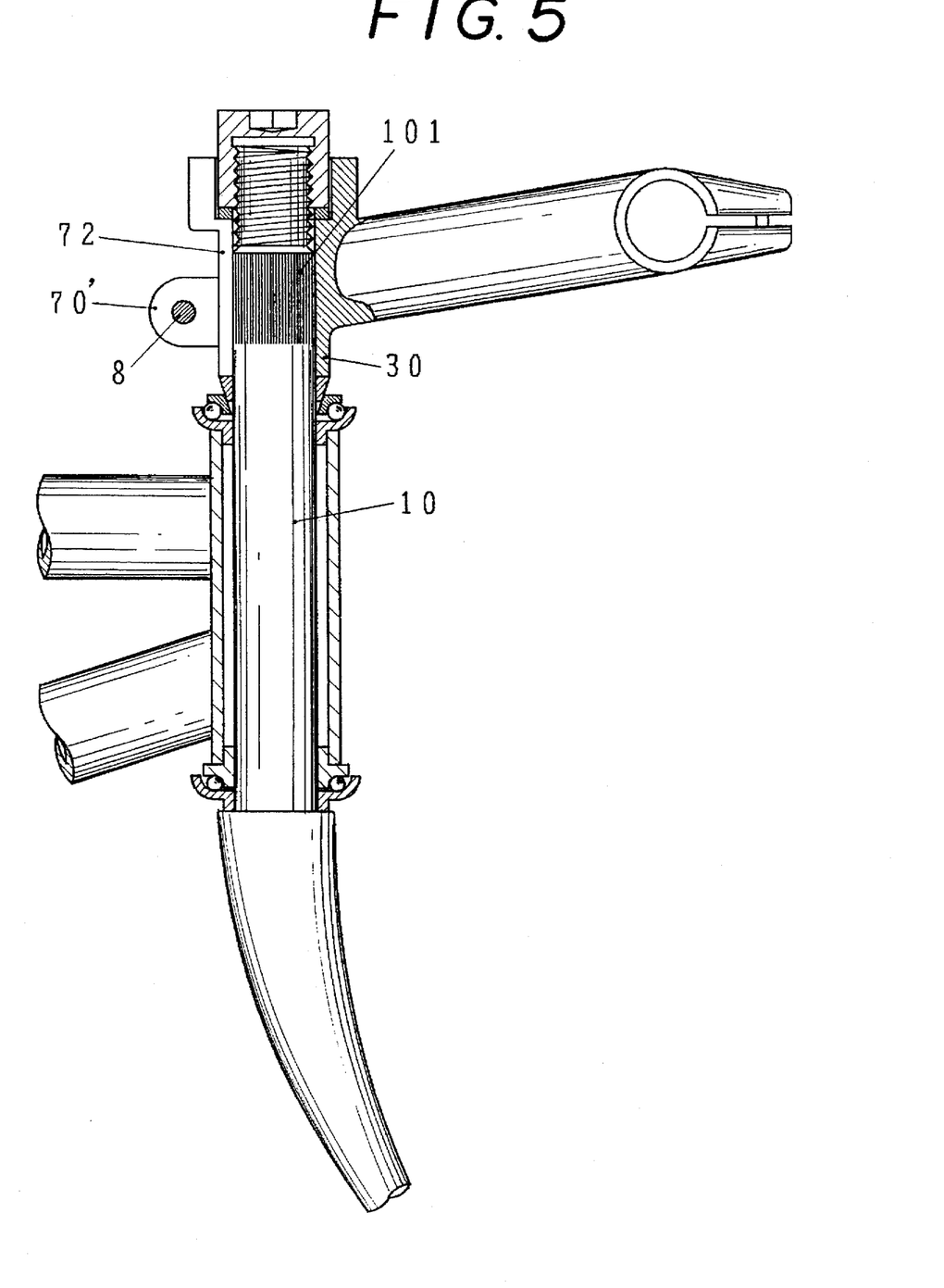
FIG. 5 is a longitudinal sectional view of the stem-binding cylinder fixed on the fork stem of a third embodiment.
Figure 6:
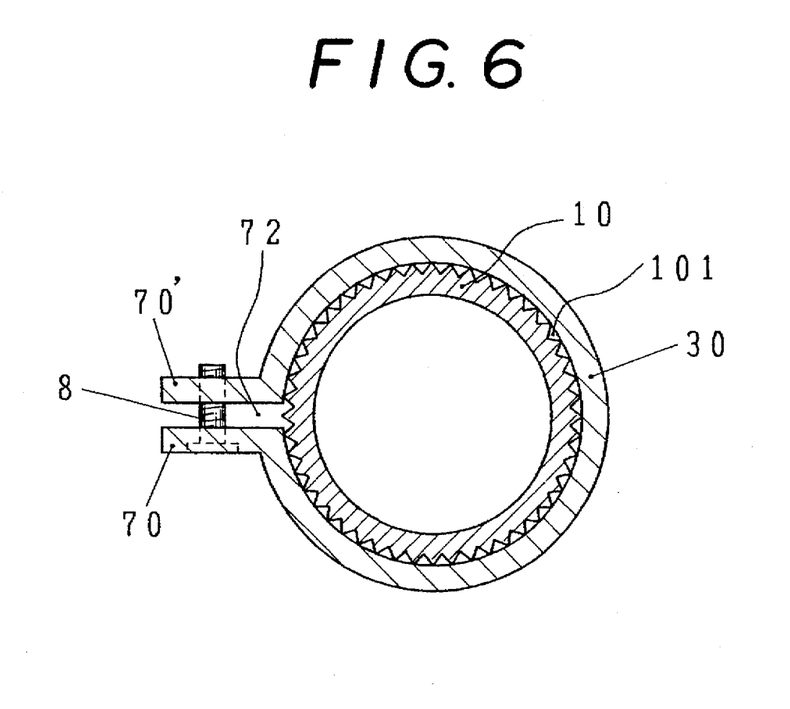
FIG. 6 is a transverse sectional view of stem-binding cylinder and the fork stem of the third embodiment.
Figure 7:
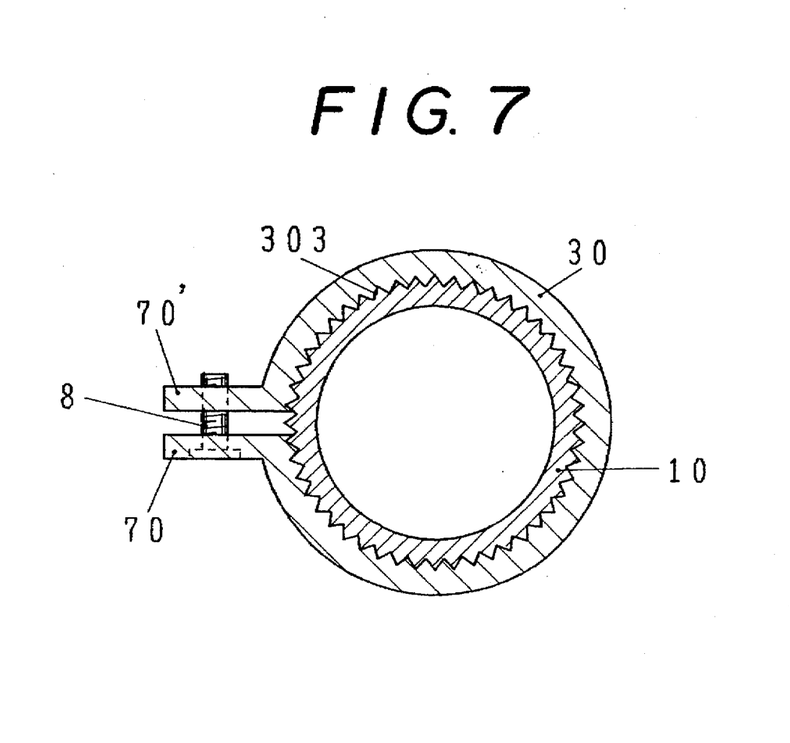
FIG. 7 is a transverse sectional view of stem-binding cylinder and the fork stem of a fourth embodiment.

As shown in FIG. 5 and FIG. 6, the stem-binding cylinder 30 may have tightening ears 70, 70' which face each other with a small clearance 72 as in the conventional coupling. The tightening ears 70, 70' are perforated by holes extending in a direction normal thereto. The hole in the tightening ear 70 is a through hole and the other hole in the tightening ear 70' is a threaded hole. The fork stem 10 is inserted into the inner opening of the stem-binding cylinder 30. A bolt 8 penetrates the hole in the tightening ear 70 and is screwed into the threaded hole in the tightening ear 70'. As the bolt 8 is screwed into the threaded hole, the clearance 72 decreases and the inner diameter of the stem-binding cylinder 30 also decreases. As a result, the inner surface of the stem-binding cylinder 30 is strongly bound to the fork stem 10 by a frictional binding force. In this case, as shown in FIG. 7, it goes without saying that the stem-binding cylinder 30 can be bound to the fork stem 10 still more strongly when a knurled surface 303 is formed on the inner surface of the stem-binding cylinder 30.

Figure 8:
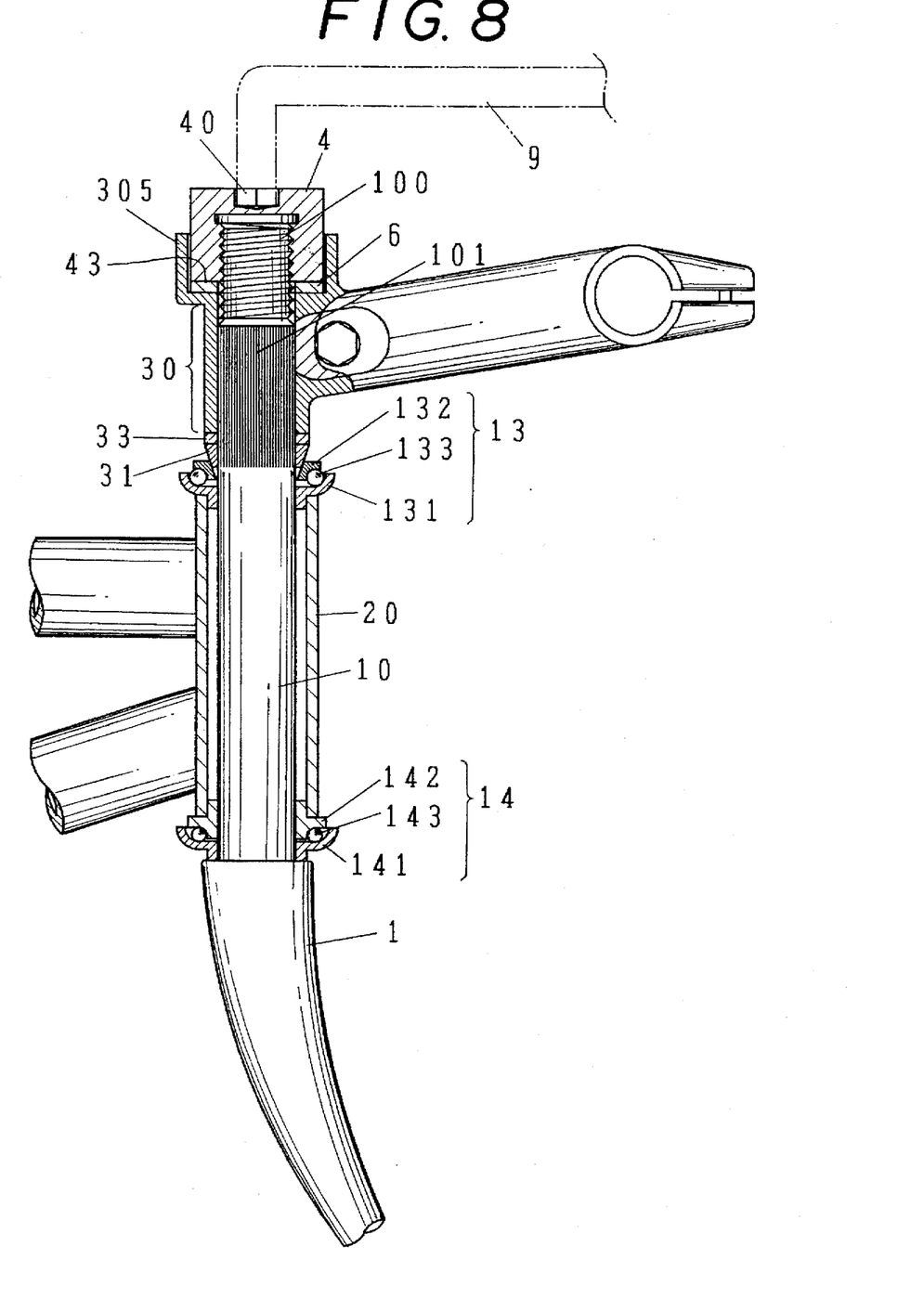
FIG. 8 is a longitudinal sectional view of the stem-binding cylinder fixed on the fork stem of a fifth embodiment.

3. Furthermore, as shown in FIG. 8, the knurled surface 101 may be extended down below to a position where the tapered ring 31 is inserted into the space between the fork stem 10 and the upper bearing 13. In this state, even if the screw cap 4 becomes loose and the fixing force in the axial direction is gone, the binding force of the stem-binding cylinder 30 to the fork stem 10 is not loosened, because the tapered ring 31 like a wedge presses against the knurled surface 101 of the fork stem 10 with stability. Accordingly, a backlash on the upper bearing 13 can be prevented.

Figure 11:
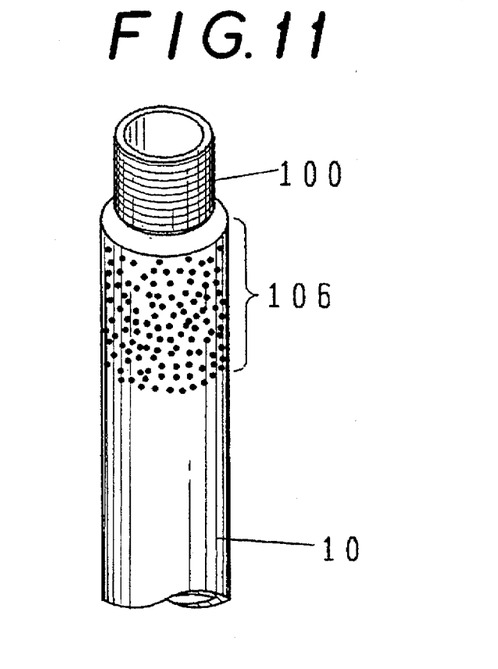
FIG. 11 is a perspective view of a fork stem having a shot blasted surface.

4. The knurled surface in the above mentioned embodiments has many ribs which are parallel to the axial direction. However, a knurled surface having a criss-cross pattern can be used. Also, a rough surface 106 may be formed by shotblasting without the knurling process, as shown in FIG. 11.

Figure 12:
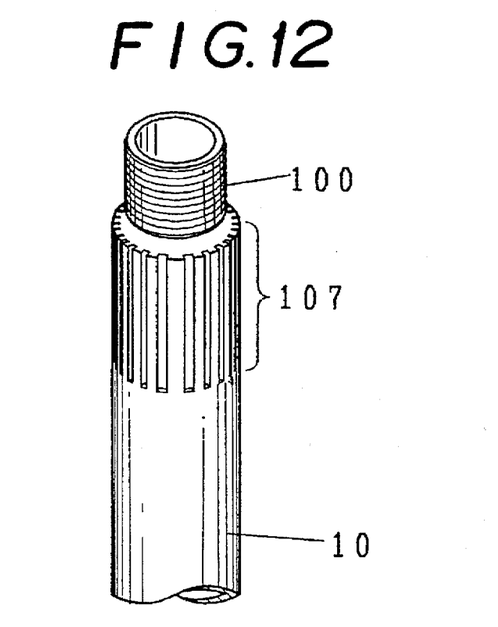
FIG. 12 is a perspective view of a fork stem having slots.

Furthermore, as shown in FIG. 12, in addition to the knurling process, by carving many slots, long and slender grooves 107 can be formed. The shotblasted surface or the many grooves may be also formed on the inner surface of the stem-binding cylinder 30 or on the partial cylindrical curved surfaces 341,351 of the skew blocks 34, 35.

What is claimed is:

1. In a device for fixing a handle stem of a bicycle to a fork stem of the bicycle, the fork stem being rotatably inserted into a head pipe of a frame of the bicycle, the head pipe having an upper end and the fork stem having an upper portion which projects out from the upper end of the head pipe, the upper portion of the fork stem having an outer surface, the handle stem including a stem-binding cylinder having an inner surface, and the stem-binding cylinder being fixed on the upper portion of the fork stem, with the outer surface of the upper portion of the fork stem being pressed by the inner surface of the stem-binding cylinder so that the stem-binding cylinder does not rotate on the fork stem, an improvement wherein:

the outer surface of the fork stem includes a plurality of ribs parallel to the fork stem, the ribs being located where the outer surface of the fork stem is pressed by the stem-binding cylinder; and the stem-binding cylinder includes mutually opposed tightening ears, the tightening ears being perforated by holes, the stem-binding cylinder further including a bolt penetrating the holes in the tightening ears such that an inner diameter of the stem-binding cylinder decreases as the bolt is tightened.

2. A device as claimed in claim 1, wherein the ribs on the outer surface of the fork stem are formed by knurling the outer surface of the fork stem.

3. In a device for fixing a handle stem of a bicycle to a fork stem of the bicycle, the fork stem being rotatably inserted into a head pipe of a frame of the bicycle, the head pipe having an upper end and the fork stem having an upper portion which projects out from the upper end of the head pipe, the upper portion of the fork stem having an outer surface, the handle stem including a stem-binding cylinder having an inner surface, and the stem-binding cylinder being fixed on the upper portion of the fork stem, with the outer surface of the upper portion of the fork stem being pressed by the inner surface of the stem-binding cylinder so that the stem-binding cylinder does not rotate on the fork stem, the improvement wherein:

the outer surface of the fork stem includes a plurality of ribs parallel to the fork stem, the ribs being located where the outer surface of the fork stem is pressed by the stem-binding cylinder; and the inner surface of the stem-binding cylinder has further ribs, the further ribs fitting between adjacent ones of the ribs on the outer surface of the fork stem; and the stem-binding cylinder includes mutually opposed tightening ears, the tightening ears being perforated by holes, the stem-binding cylinder further including a bolt penetrating the holes in the tightening ears such that an inner diameter of the stem-binding cylinder decreases as the bolt is tightened.

4. In a device for fixing a handle stem of a bicycle to a fork stem of the bicycle, the fork stem being rotatably inserted into a head pipe of a frame of the bicycle, the head pipe having an upper end and the fork stem, having an upper portion which projects out from the upper end of the head pipe, the upper portion of the fork stem having an outer surface, the handle stem including a stem-binding cylinder having an inner surface, and the stem-binding cylinder being fixed on the upper portion of the fork stem, with the outer surface of the upper portion of the fork stem being pressed by the inner surface of the stem-binding cylinder so that the stem-binding cylinder does not rotate on the fork stem, the improvement wherein:

the outer surface of the fork stem includes a plurality of friction-providing protrusions where the outer surface of the fork stem is pressed by the stem-binding cylinder; and the stem-binding cylinder includes mutually opposed tightening ears, the tightening ears being perforated by holes, the stem-binding cylinder further including a bolt penetrating the holes in the tightening ears such that an inner diameter of the stem-binding cylinder decreases as the bolt is tightened.

5. In a device for fixing a handle stem of a bicycle to a fork stem of the bicycle, the fork stem being rotatably inserted into a head pipe of a frame of the bicycle, the head pipe having an upper end and the fork stem having an upper portion which projects out from the upper end of the head pipe, the upper portion of the pipe stem having an outer surface, the handle stem including a stem-binding cylinder having an inner surface, and the stem-binding cylinder being fixed on the upper portion of the fork stem, with the outer surface of the upper portion of the fork stem being pressed by the inner surface of the stem-binding cylinder so that the stem-binding cylinder does not rotate on the fork stem, the improvement wherein:

the outer surface of the fork stem includes a friction-providing surface where the outer surface of the fork stem is pressed by the stem-binding cylinder, wherein the friction-providing surface includes a plurality of protrusions;

the stem-binding cylinder includes mutually opposed tightening ears, the tightening ears being perforated by holes;

a bolt penetrates the holes in the tightening ears; and an inner diameter of the binding cylinder decreases as the bolt is tightened.

6. A device as claimed in claim 5, wherein one of the holes perforating the tightening ears is a threaded hole, wherein the tightening ears are brought together when the bolt is tightened into the threaded hole.

7. A device as claimed in claim 5, wherein the plurality of protrusions includes a plurality of ribs, the ribs being substantially parallel to the pipe stem.

8. A device as claimed in claim 7, wherein one of the holes perforating the tightening ears is a threaded hole, wherein the tightening ears are configured such that the tightening ears are brought together when the bolt is tightened into the threaded hole.

9. A device as claimed in claim 5, wherein the friction-providing surface is a knurled friction-providing surface.

10. A bicycle, comprising:

a frame which includes a head pipe having an upper end;

a fork stem which is rotatably inserted into the head pipe, the fork stem having an upper portion which has a friction-providing surface and which projects out from the upper end of the head pipe, wherein the friction-providing surface includes a plurality of protrusions;

a handle stem which includes a hollow stem-binding cylinder, the upper portion of the fork stem extending into the stem-binding cylinder;

first and second mutually opposed tightening ears on the stem-binding cylinder; and means for drawing the tightening ears together so that an inner diameter of the binding cylinder decreases.

11. The bicycle of claim 10, wherein:

the first tightening ear has a bore and the second tightening ear has a threaded hole which is aligned with the bore; and the means for drawing the tightening ears together includes a bolt which extends through the bore and engages the threaded hole.

12. The bicycle of claim 10, wherein the friction-providing surface of the upper portion of the fork stem is knurled to provide a friction-providing surface.

13. The bicycle of claim 12, wherein the inner surface of the stem-binding cylinder has a further knurled friction-providing surface, the further knurled friction-providing surface being in rubbing contact with the knurled friction-providing surface on the outer surface of the fork stem.

14. The bicycle of claim 10, wherein the protrusions include ribs which are parallel to the fork stem.

15. The bicycle of claim 14, wherein the inner surface of the stem-binding cylinder has further ribs, the further ribs fitting between adjacent ones of the ribs on the outer surface of the fork stem.

16. The bicycle of claim 10, wherein the inner surface of the stem-binding cylinder has further friction-providing protrusions, the further protrusions being in rubbing contact with the protrusions on the outer surface of the fork stem.

17. A bicycle, comprising:

a frame which includes a head pipe having an upper end;

a fork stem which is rotatably inserted into the head pipe, the fork stem having an upper portion which has a friction-providing surface and screw threads and which projects out from the upper end of the head pipe;

a handle stem which includes a hollow stem-binding cylinder, the stem-binding cylinder having a top end and an inner diameter, the upper portion of the fork stem extending into the stem-binding cylinder;

a hollow cylindrical head attached to the top end of the stem-binding cylinder, the cylindrical head having an inner diameter that is larger than the inner diameter of the stem-binding cylinder;

a threaded screw cap which is received within the cylindrical head and which is screwed onto the threads on the upper portion of the fork stem, the crew cap exerting a downward force on the stem-binding cylinder;

first and second mutually opposed tightening ears on the stem-binding cylinder; and means for drawing the tightening ears together so that an inner diameter of the binding cylinder decreases.

\* \* \* \* \*